March 30, 1937.  W. S. EUBANK  2,075,389
AIR CONDITIONING DEVICE
Filed Oct. 28, 1935
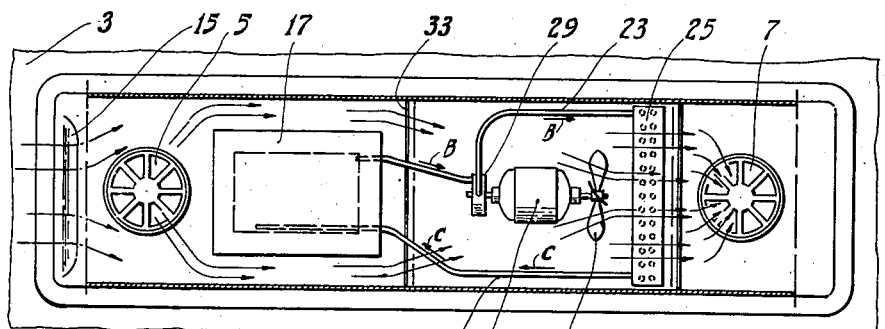
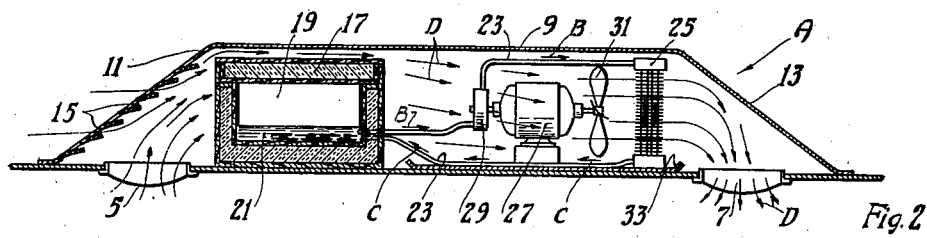
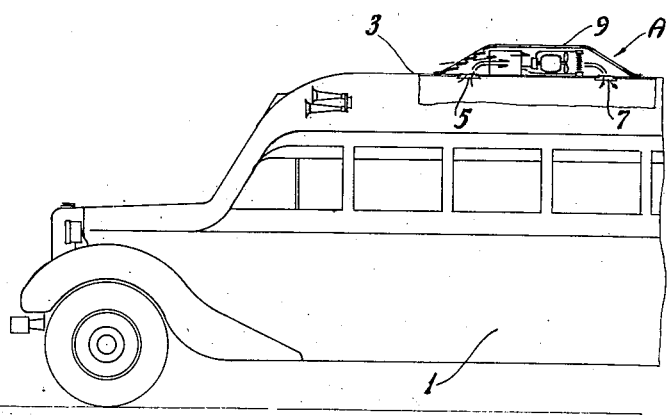
INVENTOR.
William S. Eubank
BY
Harry Sangram
ATTORNEY Patented Mar. 30, 1937

2,075,389

UNITED STATES PATENT OFFICE 2,075,389

AIR CONDITIONING DEVICE

William S. Eubank, Philadelphia, Pa.

Application October 28, 1935, Serial No. 47,036

3 Claims. (Cl. 62—117)

This invention relates to motive vehicles and more particularly to means for conditioning the air in motive vehicles of the enclosed type.

The desirability of suitably conditioning the air in dwellings, office buildings, theatres, department stores, and other similar places of public gathering has long been recognized. The considerations which apply to such structures and which make conditioning of the air therein advisable also apply, very largely, to motive vehicles, such as railroad cars, buses, automobiles, etc. Various proposals have been made to condition the air in railroad cars, for example, and while these proposals have been more or less successful, they are invariably quite expensive. In the case of buses and automobiles, attempts to provide efficient air conditioning apparatus which is both inexpensive in first cost and inexpensive to operate have met with little success, and the need for such apparatus has not, so far as I am aware, yet been met.

The primary object of my invention is to provide improved air conditioning apparatus which will fill the foregoing requirements.

More specifically, it is an object of my invention to provide, in enclosed motive vehicles, apparatus which will quickly, efficiently and inexpensively change and cool the air therewithin.

Another object of my invention is to provide an improved air conditioning apparatus as aforesaid which can be conveniently installed in vehicles now in use with substantially little alteration thereof.

Still another object of my invention is to provide an improved air conditioning apparatus of the type set forth in which the refrigerating medium can be quickly and easily replaced or replenished either en route or while the vehicle is temporarily at rest, as during a rest stop in the case of long distance buses, for example.

A further object of my invention is to provide, in combination with a motive vehicle, an improved air conditioning apparatus which is inexpensive of manufacture and installation, which is highly efficient in operation, which can easily be serviced by even an unskilled person, and which can be so mounted or arranged on the vehicle that it will not reduce the space therein.

In accordance with my invention I mount an air cooling apparatus preferably in the roof of the vehicle in a manner to afford communication between said apparatus and the interior of the vehicle. If desired, the cooling apparatus may also be arranged to receive a forced draft of air therein from the exterior as the vehicle moves forward. The refrigerant includes a liquid which is continuously pumped through a series of cooling coils out of which the forced air draft as well as air drawn from the interior of the vehicle body is passed, whereby the relatively warm air is cooled, after which it is forced down into the vehicle body, there to be warmed again and once more passed through the cooling apparatus. Preferably, although not necessarily, I employ so called "dry ice", or frozen $CO_2$, which may easily be replenished en route, and thus an adequate supply of cooling material will be constantly assured.

The novel features that I consider characteristic of my invention are set forth with particularity in the appended claims. However, the invention itself, together with additional objects and advantages thereof, will best be understood from the following description of one embodiment thereof, when taken in connection with the accompanying drawing in which:

Fig. 1 is a plan view of a refrigerating unit in accordance with my invention with a portion of the cover thereof removed.

Fig. 2 is a side elevation thereof.

Fig. 3 is a fragmentary side elevation of a bus with my improved air conditioning apparatus mounted thereon and showing, approximately, the preferred location thereof on the vehicle.

Referring more specifically to the drawing wherein similar reference characters designate corresponding parts throughout, there is shown, in Fig. 3 a motive vehicle 1, such as a bus or an automobile, having a roof 3 on which is mounted an air conditioning unit generally designated by the reference character A. The roof 3 is provided with a pair of openings 5 and 7 by means of which communication is established between the body of the vehicle and the casing or cover 9 of the unit A, the cover being of such length and so located on the roof 3 that the opening 5 is adjacent the front end thereof and the opening 7 adjacent the rear end thereof. If desired, the front wall 11 of the casing 9 may be inclined downwardly to the front and the rear wall 13 downwardly to the rear to reduce wind resistance, and the front wall may be provided with a series of louvers 15 for the admission of air directly from the atmosphere as the vehicle moves forward.

At the front end of the casing 9, adjacent the opening 5, is a refrigerating unit 17 comprising, for example, a casing 17 made of spaced celotex or similar walls having the intervening space filled with cork, dry zero, or any other suitable heat insulating material. Within the casing 17, I preferably place a solid refrigerant 19, such as solidified carbon dioxide or "dry ice", and a liquid air cooling medium 21, such as butyl alcohol, for example, the liquid 21 being in direct contact with the refrigerant 19. Coupled to the unit 17 by means of a two-way pipe line 23 which has communication with the liquid 21 within the unit 17 is a cooling unit 25 located adjacent the opening 7 and is adapted to cool a warm current of air passed thereover. A motor 27 operates a pump 29 in the pipe line 23 for maintaining a constant flow of cooled liquid from the unit 17 to the unit 25 in the direction of the arrows B and for returning the warmed liquid in the direction of the arrows C after it has absorbed heat from the air passed over or through the unit 25. A fan 31, also operated by the motor 27, draws air into the casing 9 from the vehicle body through the opening 5, forces it rearwardly out the cooling coils of the unit 25 in the direction of the arrows D, and thence through the rear opening 7 back into the body. Thus, a constant exchange of air between the body and the casing 9 is maintained, the fan 31 also serving to direct over the coils of the unit 25 the air admitted through the louvers 15. A drip pan 33 may be provided, if desired, to collect any condensed moisture on the coils 25 which drips down.

From the foregoing description, it will be apparent to those skilled in the art that I have provided a very simple and yet extremely efficient apparatus for conditioning the air in motive vehicles. By periodically replacing the solid refrigerant 19, a cool supply of air will always be assured, and a comfortable temperature maintained in the vehicle.

Although I have shown and described but one specific embodiment of my invention, I am fully aware that many modifications thereof are possible. For example, instead of arranging the unit on the roof of the vehicle, it may be mounted at the rear, as in the baggage compartment, or under the floor, or in any other convenient location. Also, in place of the specific refrigerants mentioned herein, any other suitable refrigerants may be used. I desire, therefore, that my invention shall not be limited except insofar as is made necessary by the prior art and by the spirit of the appended claims.

I claim as my invention:

1. In a motive vehicle, the combination of an enclosed body, a casing mounted on the roof of said body, said roof having a pair of openings therein whereby to provide communication between said casing and said body, and means within said casing for producing a continuous exchange of air between said casing and said body and for cooling the air as it passes through said casing, said means comprising a refrigerating unit located adjacent one of said openings and including a liquid refrigerant, a cooling unit located adjacent the other of said openings, means interposed between said units for producing a continuous exchange of said liquid between said units, and means also interposed between said units for producing a forced draft of air through said cooling unit and toward said other opening.

2. In a motive vehicle, the combination of an enclosed body, a casing mounted on the roof of said body, said roof having a pair of openings therein, one adjacent the front of said casing and the other adjacent the rear of said casing, whereby to provide communication between said casing and said body, and means within said casing for producing a continuous exchange of air between said casing and said body and for cooling the air as it passes through said casing, said means comprising a refrigerating unit located adjacent said first named opening and including a solid refrigerant and a liquid cooled thereby, a cooling unit located adjacent said other opening, a two-way pipe line coupling said units, a pump in said pipe line adapted to feed said liquid from said refrigerating unit to said cooling unit and thence back to said refrigerating unit, a motor for operating said pump, and a fan operatively connected to said motor and arranged to force a draft of air from said body through said first named opening, over said cooling unit whereby to cool the air, and thence back into said body through said other opening.

3. In a motive vehicle, the combination of an enclosed body, a casing mounted on the roof of said body, said roof having a pair of openings therein, one adjacent the front of said casing and the other adjacent the rear of said casing, whereby to provide communication between said casing and said body, and means within said casing for producing a continuous exchange of air between said casing and said body and for cooling the air as it passes through said casing, said casing having a front wall inclined downwardly toward the front of the vehicle, and said wall having a plurality of louvers therein whereby, when said vehicle moves forward, air is forced into said casing in the direction of said cooling means.

WILLIAM S. EUBANK.